United States Patent
Pellet et al.

(10) Patent No.: US 10,144,659 B2
(45) Date of Patent: Dec. 4, 2018

(54) COD ABATEMENT PROCESS FOR ELECTROCHEMICAL OXIDATION

(75) Inventors: Yves Lucien Pellet, Prevessin-Moens (FR); Didier Carle Gaston Grange, Roche-la Moliere (FR); Paolo Rossi, Brugherio (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 1873 days.

(21) Appl. No.: 11/665,583

(22) PCT Filed: Oct. 18, 2005

(86) PCT No.: PCT/EP2005/011197
§ 371 (c)(1),
(2), (4) Date: Apr. 17, 2007

(87) PCT Pub. No.: WO2006/042741
PCT Pub. Date: Apr. 27, 2006

(65) Prior Publication Data
US 2008/0087552 A1    Apr. 17, 2008

(30) Foreign Application Priority Data
Oct. 18, 2004  (IT) .............. MI2004A1974

(51) Int. Cl.
C02F 1/46     (2006.01)
C02F 1/467    (2006.01)
C02F 1/461    (2006.01)

(52) U.S. Cl.
CPC ........ C02F 1/4672 (2013.01); *C02F 1/46109* (2013.01); *C02F 2001/46133* (2013.01); *C02F 2001/46138* (2013.01)

(58) Field of Classification Search
USPC ...... 205/742, 759, 760; 204/267, 269, 275.1
See application file for complete search history.

(56) References Cited

U.S. PATENT DOCUMENTS

| | | | |
|---|---|---|---|
| 3,767,046 A * | 10/1973 | Hartkorn | ........................ 210/703 |
| 5,395,492 A | 3/1995 | Schoeberl | |
| 5,833,831 A | 11/1998 | Kitajima et al. | |
| 6,315,886 B1 * | 11/2001 | Zappi et al. | ................... 205/701 |
| 6,814,840 B2 * | 11/2004 | Henuset et al. | .............. 204/242 |
| 2001/0040102 A1 | 11/2001 | Hu et al. | |

OTHER PUBLICATIONS

Kraft et al., Anodic oxidation with doped diamond electrodes: a new advanced oxidation process, 2003, Journal of Hazardous Materials B103pp. 247-261.*
Canizares et al., Electrochemical Oxidation of Aqueous Phenol Wastes Using Active and Nonactive Electrodes, (2002), Journal of The Electrochemical Society, 149 (8) D118-D124.*
Juttner K et al. "Electrochemical Approaches to Environmental Problems in the Process Industry" Electrochimica Acta, Elsevier Science Publishers, Barking, GB, vol. 45, No. 15-16, May 2000, pp. 2575-2594, XP004206803, ISSN: 0013-4686.
Search Report dated Dec. 16, 2005 in connection with PCT/EP2005/011197.

* cited by examiner

*Primary Examiner* — Arun S Phasge
(74) *Attorney, Agent, or Firm* — Lucas & Mercanti, LLP

(57) ABSTRACT

The invention relates to an effluent COD treatment procedure by anodic oxidation combining the use of two different types of anode with a suitable apportionment of current. The first type of anode comprises an anode based on diamond doped-synthetic diamond. The second type of anode comprises an anode with high oxygen overvoltage containing tin and antimony oxides.

8 Claims, No Drawings

COD ABATEMENT PROCESS FOR ELECTROCHEMICAL OXIDATION

This application is a national phase application filed under 35 U.S.C. § 371 of PCT Application Number PCT/EP2005/011197, filed Oct. 18, 2005, which claims priority to Italian Application serial No. MI2004A 001974, filed Oct. 18, 2004.

BACKGROUND OF THE INVENTION

The treatment of effluents very rich in COD (Chemical Oxygen Demand) upstream the biologic purification units is quite challenging. For this reason, a few electrochemical techniques of COD pre-treatment have been explored. COD oxidation may be carried out by electrolysis on anodes characterised by high oxygen evolution overvoltage or with similar specific electrocatalytic properties.

The tin and antimony oxide-coated electrodes are included among those, and reference will be made in the following as a non-limiting example of high oxygen overvoltage anodes. Such electrodes have been used in plain electrolysers known in the art, for instance in perpendicular flow-type electrolysers. In such electrolysers the solution to be treated passes alternatively through anodes and cathodes consisting of meshes or sponges. The COD reduction of several effluents by this technique was actually observed, nevertheless a very low faradic yield is associated to such system, even though the COD reduction is as low as about 50%.

DESCRIPTION OF THE INVENTION

Another kind of electrode having a higher oxygen overvoltage than the tin and antimony oxide-coated anodes is known, namely the boron-doped diamond electrode (BDD), which consists of a layer of boron-doped diamond deposited on a conductive support. The drawbacks of this type of electrode are twofold, namely its cost and its relative brittleness requiring special and expensive electrolysers for its utilisation; on the other hand, its much higher potential under oxygen evolution leads to much bigger COD reduction rates with better faradic yields. It can be supposed that, due to the higher potential, a number of molecules contributing to the COD are degraded by the dissociation of their backbones.

The invention consists of the simultaneous use in series or in parallel of at least two types of electrode. The rationale is to utilise to a highest degree the handier and less expensive elements, that is the tin and antimony oxide-based anodes or other equivalent electrodes, installed in a conventional electrochemical plate or tube reactor, and to a lesser extent the BDD electrode installed in its own appropriate electrolyser to accomplish the part of reaction which cannot be carried out on the tin and antimony oxide-based anodes or equivalent thereof. Being the molecules making up the COD partially degraded by the BDD anode, it becomes easier to complete their oxidation on the tin and antimony oxide-based anode, as confirmed by the experimental observations. For each type of effluent, it will be necessary to determine the most convenient apportionment of electrical current between the two processes of oxidation on BDD and on the tin and antimony oxide-based electrode. The ideal current apportionment is usually comprised between 55:45 and 95:5, depending on the effluent type; such apportionment may be obtained in a very simple manner by acting on the overall anodic surface of each electrolyser (for instance by fixing the ratio between overall anodic surface of tin and antimony oxide-based anode to BDD at a value comprised between 55:45 and 95:5), but other solutions are also possible. For plants having to treat several kinds of effluent, it is advisable that such current apportionment be adjustable by means of systems known in the art.

The tin and antimony oxide-based electrode may be constructed according to various typologies, for example it may be obtained as a ceramic electrode, for instance sintered from powders of two oxides optionally mixed to other components, or it may consist of a metallic base, for instance of titanium or other valve metal, coated with tin and antimony oxides optionally mixed to small amounts of conductive elements (for example copper) or elements with desirable electrochemical properties (for example iridium) in order to adjust its potential. In principle, also anodes of titanium coated with oxygen-evolution catalysts (for example iridium and tantalum oxide mixtures) might be used, nevertheless the oxygen overvoltage turns out to be too low in this case and the electrolyser coupling of the invention leads to less favourable results.

The results relative to the COD treatment of a typical degreasing bath are reported hereafter. With electrodes coated with tin and antimony oxides installed in a RETEC®-type electrolyser, the COD decreased by one half in the course of 100 hours with an average faradic yield of about 7%. Once coupled the previous electrolyser with a second electrolyser containing the BDD electrode, setting 90% of the current on the RETEC®-electrolyser and 10% on the BDD-equipped electrolyser, the destruction of 80% of the COD was achieved in the course of about 100 hours with an average faradic yield higher than 24%. This method thus permits a strong improvement in the rate of destroyed COD, with a better faradic yield (lower electric energy costs), simultaneously limiting the capital investment deriving from the use of BDDs restricting the application thereof to a small percentage of the treatment.

The invention claimed is:

1. Device for COD treatment of effluents by anodic oxidation, comprising:
   a first electrolyzer equipped with a first type of anode for oxygen evolution, the first anode is an electrode coated with tin and antimony oxides;
   at least one second electrolyzer equipped with a second type of anode for oxygen evolution, said second type of anode having higher overvoltage for oxygen evolution than said first type of anode, wherein said second anode is boron-doped diamond electrode,
   wherein the first electrolyzer is connected in parallel to the at least one second electrolyzer,
   wherein the first electrolyzer and second electrolyzer are configured for simultaneous use in the COD treatment of effluents by anodic oxidation.

2. The device of claim 1, wherein said at least one second electrolyser has an overall anodic surface lower than said first electrolyser.

3. The device of claim 2, wherein the ratio between an active surface of said first electrolyser and an active surface of said at least one second electrolyser is between 55:45 and 95:5.

4. The device of claim 1, wherein the ratio between the electrical current supplied to said first and to said at least one second electrolyser is adjustable.

5. The device of claim 1, wherein an average faradic yield of higher than 24% is achieved.

6. An effluent COD treatment process comprising
carrying out an anodic oxidation process in a device comprising:
- a first electrolyzer equipped with a first type of anode for oxygen evolution, wherein the first anode is an electrode coated with tin and antimony oxides;
- at least one second electrolyzer equipped with a second type of anode for oxygen evolution, said second type of anode having higher overvoltage for oxygen evolution than said first type of anode, wherein said second anode is boron-doped diamond electrode, wherein the first electrolyzer is connected in parallel to the at least one second electrolyzer, wherein the first electrolyzer and second electrolyzer are configured for simultaneous use in the COD treatment of effluents by anodic oxidation.

7. The process of claim 6, wherein the ratio between the electrical current supplied to said first electrolyser and to said at least one second electrolyser is between 55:45 and 95:5.

8. The process of claim 6, wherein an average faradic yield of higher than 24% is achieved with the process.

* * * * *